United States Patent Office 2,761,760
Patented Sept. 4, 1956

2,761,760

PROCESS FOR THE MANUFACTURE OF TITANIUM TETRACHLORIDE

Jonas Kamlet, New York, N. Y., assignor to National Distillers Products Corporation, New York, N. Y., a corporation of Virginia No Drawing. Application June 2, 1955,
Serial No. 512,867

8 Claims. (Cl. 23—87)

This invention relates broadly to a process for the manufacture of titanium tetrachloride. More particularly, it relates to a process for the manufacture of titanium tetrachloride by the reaction of titaniferous raw materials with nitrosyl chloride.

One purpose of this invention is to provide an alternative, inexpensive chlorinating agent for the conversion of titaniferous raw materials to titanium tetrachloride. A further purpose is to provide a method for the chlorination of titaniferous raw materials by the use of agents other than electrolytic chlorine, for instance, by the use of hydrochloric acid as the effective chlorinating agent. Another purpose of this invention is to provide a simple method for the utilization of hydrochloric acid, converted to nitrosyl chloride, in the manuafacture of titanium tetrachloride. It has for a further purpose the provision of industrial outlets for the nitrosyl chloride obtainable as a by-product, for instance, in the manufacture of alkali metal nitrates by the reaction of alkali metal chlorides with nitric acid. Other and additional purposes of this invention will become apparent in the course of the description below.

Titanium tetrachloride has heretofore been manufactured to a large extent by the reaction of elemental chlorine with a titaniferous raw material admixed with a carbonaceous reducing agent, such as coal, coke, charcoal, carbon monoxide, and the like. A binder such as tar, pitch, or molasses is usually added to prevent the pelleted or compacted mixture of reagents from crumbling during the chlorination.

The chlorination is carried out at temperatures between 500° C. and 1300° C., usually at atmospheric or subatmospheric pressures, according to the equation:

$$TiO_2 + 2Cl_2 + 2C \rightarrow TiCl_4 + 2CO$$

According to the present invention, it has been found that nitrosyl chloride is a very good chlorinating agent and converts the titanium dioxide present in titaniferous raw materials smoothly and in good yield to titanium tetrachloride, according to the following equation:

$$TiO_2 + 4NOCl \rightarrow TiCl_4 + 2NO + 2NO_2$$

Although this reaction proceeds smoothly as indicated by the equation, it proceeds considerably more rapidly in the presence of at least a stoichiometric amount of carbon present as a carbonaceous reducing agent. There should be sufficient carbon to maintain the by-product nitrogen oxides entirely as NO, i. e.:

$$TiO_2 + 4NOCl + 2C \rightarrow TiCl_4 + 2CO + 4NO$$

The titanium bearing raw materials suitable for use in the process of this invention are titanium dioxide such as the purified pigment or chemical grade of titanium dioxide and such ores, slags, minerals and by-products as rutile, ilmenite, ilmenite-magnetite, ilmenite-hematite, titaniferous magnetite, titaniferous hematite, arizonite, titaniferous beach sands, residues from the beneficiation of bauxite by the Bayer process (the so-called "red mud"), blast furnace slags, open-hearth slags containing appreciable amounts of titanium dioxide, and the high-titania slag obtained by the smelting of ilmenite in the electric furnace in the presence of coke and limestone or a dolomitic flux such as slags averaging 72% $TiO_2$ and 9% FeO obtained as by-products.

Nitrosyl chloride can be produced by a variety of methods. For instance, nitrosyl chloride can readily be prepared by the reaction of hydrochloric acid and nitric acid, according to the equation:

$$3HCl + HNO_3 \rightarrow NOCl + Cl_2 + 2H_2O$$

The heating together of an aqueous solution of these two reagents, in the approximate proportions required by the above equation, causes the above reaction to proceed to substantial completion. The reaction is endothermic, and requires application of heat. Similarly, liquid nitric acid and gaseous hydrogen chloride will react according to the above equation to form a mixture of nitrosyl chloride and chlorine. Since hydrochloric acid solution as dilute as 5% HCl can advantageously be used in the preparation of nitrosyl chloride by this reaction with nitric acid, this offers a good use for the very considerable quantities of by-product muriatic acid available from many different types of chemical operations.

Similarly, nitrosyl chloride can be prepared by the reaction of alkali metal chlorides, for instance NaCl, KCl, LiCl, with nitric acid according to the equation:

$$3NaCl + 4HNO_3 \rightarrow 3NaNO_3 + Cl_2 + NOCl + 2H_2O$$

This process provides a means for obtaining a valuable co-product of alkali metal nitrate, e. g. sodium nitrate, potassium nitrate, in the course of the preparation of nitrosyl chloride to be employed as a chlorinating agent in the process of this invention.

The mixture of nitrosyl chloride and chlorine obtained either by the above procedures or by any other suitable method may be used directly in the conversion of the titaniferous raw materials of this invention to titanium tetrachloride, without intermediate separation of the nitrosyl chloride from the chlorine. The chlorine in the mixture reacts as if it alone were present and converts the titanium dioxide in the presence of the carbonaceous reducing agent to titanium tetrachloride. The nitrosyl chloride in the mixture similarly chlorinates the titanium dioxide to titanium tetrachloride with or without the conjoint action of the carbonaceous reducing agent.

For the preferred method of operation of the process of this invention, the titaniferous raw materials are admixed with the carbonaceous reducing agent, e. g. coal, coke, or charcoal and the like, and mixtures thereof, in quantity at least sufficient stoichiometrically to react with the titanium dioxide and a binding agent, e. g. tar, pitch, molasses, starch, or glue and the like, and is formed or pressed into pellets, pills or discrete masses. There should be used at least 2 atomic equivalents per mole of $TiO_2$. The thus formed pellets, pills or discrete masses are then dried and used in the chlorination. The purpose of this step is to prevent the reaction product from crumbling or disintegrating in the course of the chlorination at the advanced temperatures.

When pure nitrosyl chloride is used as a chlorinating agent in the process of this invention, the use of a carbonaceous reducing agent in the reaction mixture is unnecessary, since good results can be obtained in the absence of such a reducing agent. However, where chlorine itself is used as a chlorinating agent as employed in the prior art processes for the manufacture of titanium tetrachloride, the use of such a carbonaceous reducing agent is absolutely necessary. Thus, using the theoretical two moles of carbon per mole of titanium dioxide, the yields shown in Table I are obtained by the use of nitrosyl chloride, by the use of chlorine, and in the presence or absence of the carbonaceous reducing agent in a single pass, and using a stoichiometric excess of the TiO₂ so as to obtain maximum conversion of the chlorinating agent.

*Table I*

| Yield of Titanium Tetrachloride | Pure NOCl, percent | Mixture of NOCl and Cl₂, percent | Chlorine, percent |
|---|---|---|---|
| without carbon | 54 | 34 | 3.2 |
| with carbon | 78 | 75 | 60.2 |

The reaction with the nitrosyl chloride or the mixture of NOCl and Cl₂ obtained, as in the processes above described, is effected within a temperature range of 400° C. to 1300° C., and preferably within the range of 500° C. to 700° C. This reaction may be effected at atmospheric, sub-atmospheric or superatmospheric pressures, but no advantage is seen in operating at pressures other than atmospheric.

The reaction can be effected in any suitable type of equipment constructed of materials resistant to the reagents at the advanced temperatures of the reaction. A fixed bed reactor, or a fluid bed reactor may be employed with the chlorinating reagent, NOCl or the mixture of NOCl and chlorine, being passed through the bed of briquettes, pellets or discrete masses of the titaniferous raw material.

The process is operated by initially forming the briquettes, pellets, pills or discrete masses of the mixture of the titaniferous raw material, the carbonaceous reducing agent and the binder. The pellets are then furnaced to a temperature between 1000° C. and 1300° C. This gives a compact, easily chlorinated, non-friable mass. This furnacing also appears to reduce the titanium dioxide to the lower oxides of titanium at least in part (TiO, Ti₂O₃), and assists in the ultimate conversion to titanium tetrachloride. The pelletizing or briquette formation is optional. Other methods may be employed to prepare the titaniferous raw materials for the chlorination reaction. The formed briquettes, pellets, pills, or discrete masses are then charged into the chlorination reactor, and maintained within the reaction temperature, that is, 400° C. to 1300° C., and preferably within the range of 500° C. to 700° C.

The mixture of nitrosyl chloride and chlorine obtained by any suitable way such as above indicated, or purified nitrosyl chloride, preferably pre-cooled to remove and separate any water or moisture present, is then passed through the bed of the titaniferous charge, at a rate of flow and for a period sufficient to effect the most efficient conversion to titanium tetrachloride.

The effluent gases from this reaction are then cooled to a temperature below 130° C. to condense and recover the titanium tetrachloride contained therein. Titanium tetrachloride is a colorless to reddish-yellow liquid boiling at 136° C./at 760 mm. Hg. When prepared from titaniferous raw materials containing other components (such as the ores, minerals, slags, by-products referred to above), the titanium tetrachloride thus obtained will contain small and varying amounts of impurities such as ferrous chloride, ferric chloride, vanadium chlorides, silicon tetrachloride, sulfur chlorides, aluminum chloride, zirconium chloride, and the like.

Following condensation of the titanium tetrachloride, the residual effluent gases contain nitrogen oxides, both NO and NO₂, minor amounts of unreacted nitrosyl chloride, carbon monoxide, carbon dioxide, chlorine and nitrogen. This gas mixture can be admixed with oxygen, or an oxygen-containing gas, to convert all of the nitrogen oxides present therein to NO₂, and then absorbing the said gas mixture containing NO₂, in the presence of excess oxygen or an oxygen-containing gas, in water to convert the nitrogen oxides to nitric acid. This nitric acid may be returned to the first step of the process for the manufacture of more nitrosyl chloride, if desired.

Thus, a preferred modification or embodiment of this process involves reacting nitric acid with hydrochloric acid or an alkali metal nitrate, to obtain a mixture of nitrosyl chloride and chlorine. This gas mixture, after drying or condensing the moisture content thereof by cooling, is reacted with a titaniferous raw material. The effluent gases from the reaction are cooled to condense the titanium tetrachloride. The residual effluent gases are then oxidized with an oxygen-containing gas to convert the nitrogen oxides contained therein to NO₂, which is then converted to nitric acid by procedures well known to the art. The said nitric acid is then returned to the first step of the process to supply at least a portion of the nitric acid required for the generation of additional nitrosyl chloride.

The titanium tetrachloride, when obtained impure by the process of this invention, from titaniferous ores, slags, minerals and/or by-products may be further purified by any of the procedures well known to the art, for instance, by fractionation, treatment with hydrogen sulfide, treatment with copper, and the like. When purified by fractionation and treatment with copper, titanium tetrachloride made from rutile and ilmenite by this process is water-white and contains 0.007% of iron and 0.006% of silicon. This material is ideally suited for all uses to which titanium tetrachloride is adapted. For instance, in the manufacture of titanium metal by reduction with magnesium or with sodium, in the manufacture of titanium dioxide pigments, in the preparation of titanium esters and other inorganic and organic derivatives of titanium.

The following examples are presented to further define and illustrate the invention but are intended in no way to limit it to the specific reagents, proportions or conditions described therein. Obvious modifications will occur to any person skilled in the art. All parts are by weight unless otherwise specified.

*Example 1*

A rutile ore was used as the titaniferous raw material, analyzing 77.5% TiO₂, 6.2% Fe₂O₃, 4.4% SiO₂, and 3.8% Al₂O₃. This material was ground to a fineness of 100 mesh. The rutile (250 parts) was mixed with 40 parts of powdered petroleum coke, 15 parts of molasses (as a binder) and 40 parts of water, and was formed into pellets. The pellets were then furnaced in the electric oven at 1100° C. for one-half hour. These were now charged into a quartz tube heated in a tube furnace maintained in a vertical position.

A mixture of equimolar amounts of nitrosyl chloride and chlorine was prepared by refluxing together a mixture of 111 parts of hydrogen chloride (3 moles), 63 parts of nitric acid (1 mole) and 216 parts of water. The mixture of nitrosyl chloride, chlorine and water evolved was passed through an efficient water-cooled condenser, cooled to condense the water in a trap, and was then passed through the reactor tube containing the pelleted titaniferous charge, the said tube being maintained in a furnace at a temperature of 600°–650° C. The NOCl-Cl₂ mixture is passed through at the rate of about 100 cc. of the gas per minute until no more titanium tetrachloride condenses on the cooling of the effluent gases. The effluent gases are cooled, the condensed titanium tetrachloride is collected and the effluent gases are absorbed in standard caustic soda solution and analyzed for recovery of nitrosyl chloride and nitrogen oxides.

Conversion of titanium dioxide to titanium tetrachloride was 91.5%. Of the nitrogen oxides recovered in the effluent gases as nitric acid, 88.9% of the nitric acid originally used in the generation of the nitrosyl chloride-chlorine was recovered and can be recycled in the process.

Example 2

An ilmenite ore was used as the raw material, assaying 44.2% $TiO_2$, 35% FeO, 16.0% $Fe_2O_3$ and 4.5% $SiO_2$. 250 parts of this ore (ground to 100 mesh) were mixed with 30 parts of powdered wood charcoal, 15 parts of coal tar pitch and 50 parts of water, and was formed into pellets. These pellets were then furnaced in the electric oven at 1000° C. for 45 minutes. These were now charged into a quartz tube heated in a tube furnace maintained in a vertical position.

A gaseous mixture of nitrosyl chloride and chlorine was generated by the reaction of nitric acid and sodium chloride. The gas mixture was cooled to condense the moisture contained therein, and was then passed through the above-described charge of pelletized titaniferous raw materials at a temperature of 625° to 650° C. at the rate of about 150 cc. of the gas per minute, until no more titanium tetrachloride condensed on cooling the effluent gases. The effluent gases were then processed, as above described, for the conversion of the nitrogen oxides contained therein to $NO_2$ and the conversion of the latter to nitric acid.

Conversion of titanium dioxide in the ilmenite to titanium tetrachloride was 89.9%. The recovery of nitric acid from the nitrogen oxides in the effluent gases was equivalent to 82.7% of the nitrosyl chloride generated.

What is claimed is:

1. A process for the manufacture of titanium tetrachloride which comprises contacting a titania-containing material with at least four moles of nitrosyl chloride per mole of titania at a temperature of from about 400 to about 1300° C.

2. A process for the manufacture of titanium tetrachloride which comprises contacting a titania-containing material with a mixture of nitrosyl chloride and chlorine at a temperature of from about 400 to about 1300° C., said mixture being used in an amount sufficient to provide for contact with said titania-containing material of at least four atoms of chlorine per mole of titania.

3. A process for the manufacture of titanium tetrachloride which comprises contacting a titanium oxide containing material with at least four moles of nitrosyl chloride per mole of titanium oxide at a temperature of from about 400 to about 1300° C. in the presence of a reducing agent.

4. A process according to that described in claim 3 wherein the reducing agent is selected from the group consisting of coal, coke, and charcoal, and mixtures thereof.

5. A process for the manufacture of titanium tetrachloride which comprises reacting a titanium oxide containing material at from about 400 to about 1300° C with a mixture of nitrosyl chloride and chlorine in the presence of a reducing agent, said mixture being used in an amount sufficient to provide for contact with said titanium oxide of at least four atoms of chlorine per mole of titanium oxide.

6. A process according to that described in claim 5 wherein the reducing agent is selected from the group consisting of coal, coke, charcoal, and mixtures thereof.

7. A process for the manufacture of titanium tetrachloride which comprises contacting a titania-containing material, admixed with a carbonaceous reducing agent, with at least four moles of nitrosyl chloride per mole of titania at a temperature between 400 and 1300° C.

8. A process for the manufacture of titanium tetrachloride which comprises contacting a titania-containing material, admixed with a carbonaceous reducing agent, with a mixture of nitrosyl chloride and chlorine at a temperature between 400 and 1300° C., said mixture being used in an amount sufficient to provide for contact with said titania of at least four atoms of chlorine per mole of titania.

References Cited in the file of this patent

J. W. Mellor: "A Comprehensive Treatise on Inorganic and Theoretical Chem.," vol. 7, page 84 and vol. 8, page 617. Longmans, Green and Co., N. Y.